J. B. BARTHOLOMEW.
REEL MECHANISM FOR PLANTERS.
APPLICATION FILED JUNE 21, 1911.

1,058,694.

Patented Apr. 8, 1913.

2 SHEETS—SHEET 2.

WITNESSES

INVENTOR
J. B. Bartholomew
By H. H. Bliss Attorney

UNITED STATES PATENT OFFICE.

JOHN B. BARTHOLOMEW, OF PEORIA, ILLINOIS, ASSIGNOR TO AVERY COMPANY, A CORPORATION OF ILLINOIS.

REEL MECHANISM FOR PLANTERS.

1,058,694. Specification of Letters Patent. Patented Apr. 8, 1913.

Original application filed March 6, 1908, Serial No. 419,434. Divided and this application filed June 21, 1911. Serial No. 634,509.

*To all whom it may concern:*

Be it known that I, JOHN B. BARTHOLOMEW, a citizen of the United States, residing at Peoria, in the county of Peoria and State of Illinois, have invented certain new and useful Improvements in Reel Mechanisms for Planters, of which the following is a specification, reference being had therein to the accompanying drawing.

This invention relates to planters adapted for planting corn and more especially to planters of the " check-row " type.

The object of the invention is to provide an improved mechanism for reeling and controlling the check wire which is used with planters of the class referred to.

In the accompanying drawings which form a part of this specification I have shown that form of my invention which I now deem preferable.

Figure 1:
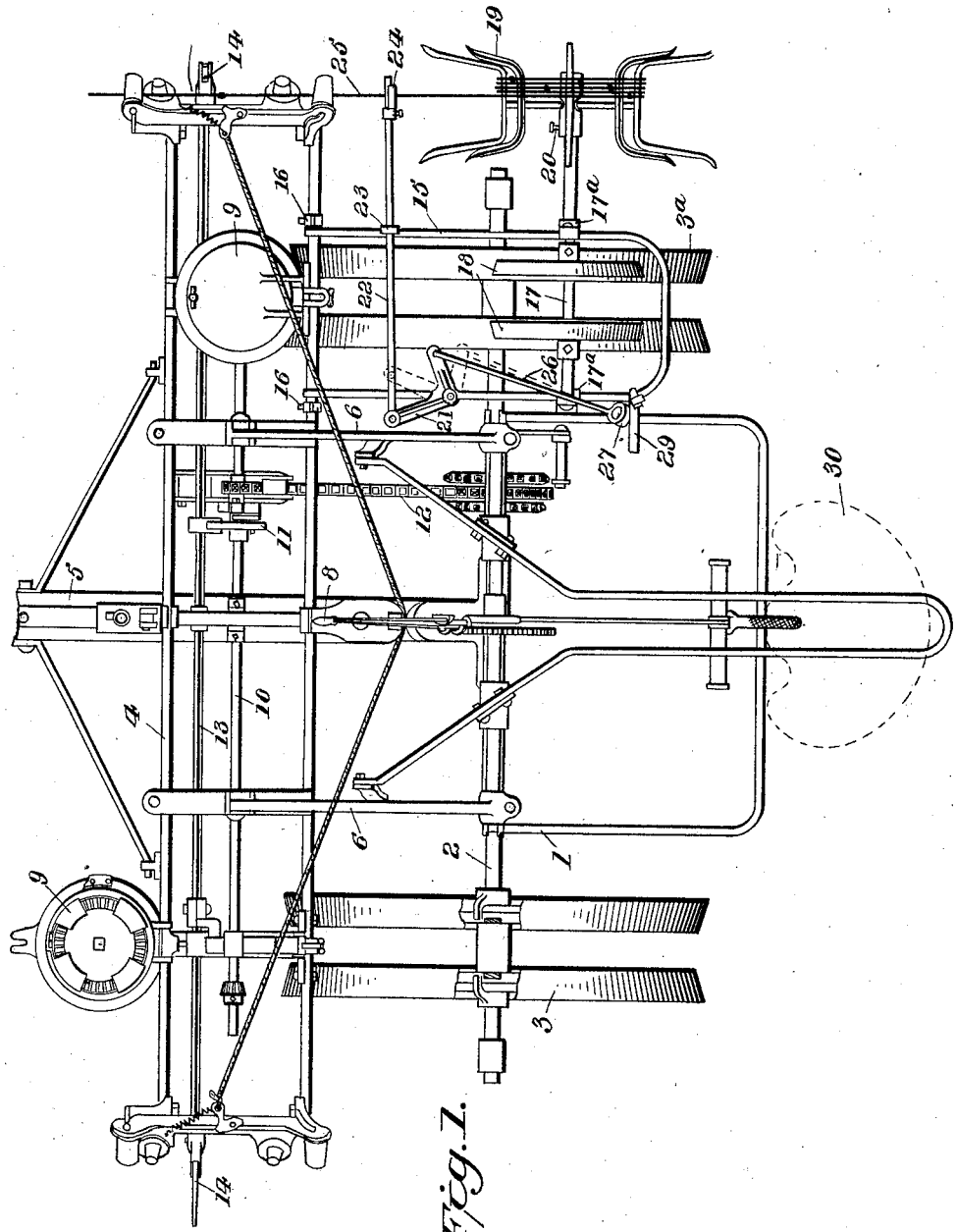
Figure 2:
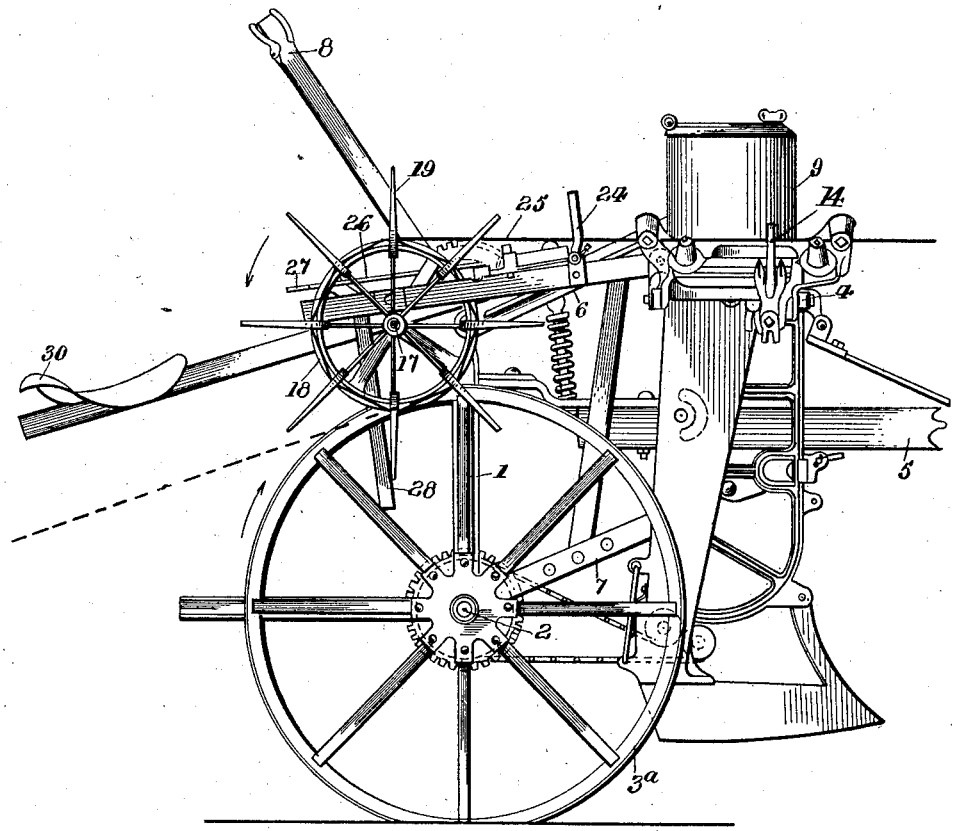

Of the drawings, Figure 1 is a plan view of a planter having a reeling mechanism embodying my invention. Fig. 2 is a side elevation of the planter shown in Fig. 1.

Referring to the drawings, 1 represents the main or rear frame of a planter. This frame is mounted upon the rotating axle 2 which is supported upon and driven by the ground wheels 3, $3^a$.

4 represents the forward frame of the planter which is connected with the draft tongue 5. The two frames 1 and 4 are connected by means of two pairs of parallel motion links 6 and 7. Movement of the front frame relative to the rear frame may be brought about by means of the hand lever 8, the links 6 and 7 serving to maintain the frames parallel.

Upon the front frame 4 are mounted the seeder mechanisms 9, 9 which are driven by means of the transverse shaft 10, the intermittingly acting clutch 11, and the chain 12 from the main axle 2. The operation of the clutch 11 is controlled by means of the rock shaft 13 which carries forks 14, 14 at its ends.

15 is a reel frame preferably formed of a single bar of metal bent U-shaped and pivotally connected at its forward ends to the frame 4 by means of suitable brackets 16, 16.

17 is a rotatable transverse shaft mounted in suitable bearings $17^a$, $17^a$ near the rear end of the frame 15. This frame carries two rigidly connected wheels 18, 18 which engage respectively with the two parts of one of the main driving wheels $3^a$. The shaft 17 is extended outward and carries near its outer end the reel 19. This reel is preferably connected with the shaft by means of a set screw 20 or equivalent device, so that it can be readily removed when not in use.

21 is a bell crank mounted on the inner side of the frame 15 for pivotal movement about a vertical axis. To one arm of this crank is pivotally connected a transverse link 22 which slidably engages the eye or guide 23 on the outer side of the frame 15. At the outer end of the link 22 is an upward extending fork or eye 24 for receiving a check wire 25. The other arm of the bell crank 21 has pivotally connected with it a link 26 having a handle 27 at its rear end. Near the rear end of the frame 15 there is provided a downward extending arm 28 which has at its lower end an inward projecting foot rest 29. The foot rest 29 is within reach of the foot of the driver on the seat 30.

In operation, let it be assumed that the check-row wire has been wound upon the reel 19 and that it is desired to unwind wire to prepare for planting. The reel is placed upon the shaft 17 preferably in the position to unwind from the bottom as indicated in dotted line in Fig. 2. If the reel is rigidly connected to the shaft 17 by means of the set screw 20, the wheels 18, 18 engaging with the drive wheel $3^a$ will tend to rotate it in the direction indicated by the arrow in Fig. 2. However, for unwinding, the reel must rotate in the other direction and this reverse rotation is possible only by a slipping of the wheels 18, 18. On account of the resistance offered by these wheels, the reel is unwound under considerable tension. After unwinding, the reel 19 is preferably removed from the machine and set aside until rewinding is desired. When the wire is to be rewound this can be accomplished, if desired, while the last row is being planted. The reel 19 is secured in place on the shaft 17 and the end of the wire 25 after having been passed through the check head and the fork or eye 24 is secured to the reel. The planter has then started on the last row and the reel 19 immediately commences to wind the wire. The diameter of the wheels 18, 18 is somewhat less than the effective diameter of the reel and as a result there is a tendency for the wire to be wound faster than the rate of travel of the planter will permit. As a result of this there is a slippage of the wheels 18, 18 and the wire is maintained under constant tension. If the friction of the wheels 18, 18 against the drive wheel 3ª is not normally sufficient to give the proper tension, then this friction can be increased by the driver pressing his foot down upon the foot rest 29. The wire can be guided back and forth across the reel as it is wound thereon by means of the fork or eye 24 which is controlled by the operator by means of the handle 27, the link 26, the bell crank 21, and the link 22.

It will, of course, be understood that it is not necessary to have the wire pass through the check head during winding. If desired, the wire can be allowed to pass directly through the fork 24 and reel from beneath the check head instead of through it.

This application constitutes a division of my application for corn planters filed March 6, 1908, Serial No. 419,434. In the said application I have shown and claimed the peculiar frame construction and the controlling mechanism therefor which are herein disclosed. These features are not therefore claimed as a part of this present invention.

What I claim is:

1. In a check-row planter, the combination with a main frame, supporting and driving wheels for the main frame, and a transverse seeder frame movably connected with the main frame at its forward end, of a reel frame mounted above one of the wheels and connected at its forward end to the seeder frame for movement with respect thereto about a transverse horizontal axis, a reel rotatably mounted upon the reel frame, and friction wheels connected with the reel frame and the reel and arranged to engage the driving wheel to support the frame and cause rotation of the reel.

2. In a check-row planter, the combination with a main frame, supporting and driving wheels for the main frame, and a transverse seeder frame movably connected with the main frame at its forward end, of a reel frame mounted about one of the driving wheels and connected at its forward end to the seeder frame for movement with respect thereto about a transverse horizontal axis, a reel rotatably mounted upon the reel frame, friction wheels connected with the reel frame and the reel and arranged to engage the driving wheels to support the frame and cause rotation of the reel, and manually controlled means for varying the pressure of the friction wheels against the driving wheels.

3. In a check-row planter, the combination with a frame and supporting and driving wheels therefor, of a substantially horizontal reel frame mounted above one of the wheels, hinge devices for connecting the reel frame to the planter frame for movement with respect thereto about a transverse horizontal axis, friction wheels connected with the reel frame for rotation about a transverse horizontal axis and arranged to engage with one of the planter driving wheels to be supported and driven thereby, and a reel mounted on the reel frame and operatively connected with the said friction wheels.

4. In a check-row planter, the combination with a frame and supporting and driving wheels therefor, of a substantially horizontal reel frame mounted above one of the wheels, hinge devices for connecting the reel frame to the planter frame for movement with respect thereto about a transverse horizontal axis, friction wheels connected with the reel frame for rotation about a transverse horizontal axis and arranged to engage with one of the planter driving wheels to be supported and driven thereby, a reel mounted on the reel frame and operatively connected with the said friction wheels, and manually controlled means for varying the pressure of the friction wheels against the driving wheel.

5. In a check-row planter, the combination with a frame and supporting and driving wheels therefor, of a substantially horizontal reel frame mounted above one of the wheels, hinge devices for connecting the reel frame to the planter frame for movement with respect thereto about a transverse horizontal axis, friction wheels connected with the reel frame for rotation about a transverse horizontal axis and arranged to engage with one of the planter driving wheels to be supported and driven thereby, a reel mounted on the reel frame and operatively connected with the said friction wheels, and a foot rest connected with the reel frame and positioned considerably below it in position to be engaged by the foot of an operator.

6. In a check-row planter, the combination with a frame and supporting and driving wheels therefor, of a substantially horizontal reel frame mounted above one of the wheels, hinge devices for connecting the reel frame to the planter frame for movement with respect thereto about a transverse horizontal axis, friction wheels connected with the reel frame for rotation about a transverse horizontal axis and arranged to engage with one of the planter driving wheels to be supported and driven thereby, a reel mounted on the reel frame and operatively connected with the said friction wheels, a check-row wire adapted to be wound on the said reel, a transversely movable guide for the wire as it is wound upon the reel, a bell crank mounted on the reel frame for movement about a vertical axis, a connection between the guide and one arm of the bell crank, and a manually controllable means connected with the other arm of the bell crank to move it.

In testimony whereof I affix my signature, in presence of two witnesses.

JOHN B. BARTHOLOMEW.

Witnesses:
J. M. CALDWELL,
L. M. STACY.

Copies of this patent may be obtained for five cents each, by addressing the "Commissioner of Patents, Washington, D. C."